United States Patent
Agrawal et al.

(10) Patent No.: US 12,395,705 B2
(45) Date of Patent: Aug. 19, 2025

(54) INPUT DEVICE-INITIATED APPLICATION ACTIVATION

(71) Applicant: Motorola Mobility LLC, Chicago, IL (US)

(72) Inventors: Amit Kumar Agrawal, Bangalore (IN); Rohit Sisodia, Naperville, IL (US)

(73) Assignee: Motorola Mobility LLC, Chicago, IL (US)

( * ) Notice: Subject to any disclaimer, the term of this patent is extended or adjusted under 35 U.S.C. 154(b) by 0 days.

(21) Appl. No.: 18/463,614

(22) Filed: Sep. 8, 2023

(65) Prior Publication Data
US 2025/0088715 A1 Mar. 13, 2025

(51) Int. Cl.
*H04N 21/485* (2011.01)
*H04N 21/422* (2011.01)

(52) U.S. Cl.
CPC ......... *H04N 21/485* (2013.01); *H04N 21/422* (2013.01)

(58) Field of Classification Search
CPC ........................... H04N 21/485; H04N 21/422
See application file for complete search history.

(56) References Cited

U.S. PATENT DOCUMENTS

| | | | |
|---|---|---|---|
| 7,020,460 B1 | 3/2006 | Sherman et al. | |
| 8,923,824 B1 | 12/2014 | Masterman | |
| 9,402,167 B2 | 7/2016 | Barat et al. | |
| 9,491,374 B1 | 11/2016 | Avrahami et al. | |
| 9,686,088 B2 | 6/2017 | Papakipos et al. | |
| 10,147,141 B1 | 12/2018 | Rixford | |
| 10,387,098 B2 | 8/2019 | Park et al. | |
| 10,531,039 B1 | 1/2020 | Bender et al. | |
| 10,554,921 B1 | 2/2020 | Lim et al. | |
| 11,231,844 B2 | 1/2022 | Steeves | |
| 11,368,579 B1 | 6/2022 | Palanivel | |
| 11,410,778 B2 | 8/2022 | Ravindranathan et al. | |
| 11,583,760 B1 | 2/2023 | Agrawal et al. | |
| 11,641,440 B2 | 5/2023 | Agrawal et al. | |
| 11,720,237 B2 | 8/2023 | Meirhaeghe et al. | |
| 2003/0061611 A1 | 3/2003 | Pendakur | |

(Continued)

FOREIGN PATENT DOCUMENTS

| | | |
|---|---|---|
| CN | 110234025 | 9/2019 |
| WO | WO-2006108288 | 10/2006 |

OTHER PUBLICATIONS

"Auto Hotspot, How to | Samsung Galaxy S10 Plus", YouTube Video uploaded by Omarr Ghafoor [online][retrieved Jun. 23, 2021]. Retrieved from the Internet <https://www.youtube.com/watch?v=2V6s31zA7p4>., Oct. 30, 2019, 4 Pages.

(Continued)

*Primary Examiner* — Nnenna N Ekpo
(74) *Attorney, Agent, or Firm* — FIG. 1 Patents

(57) ABSTRACT

In aspects of input device-initiated application activation, a media server detects initiation of an input device based on a monitoring of a set of one or more input devices that include the input device. In response to the initiation of the input device, the media server activates a streaming of an application to a display device connected to the media server. The media server restricts use of the display device to the input device while the application remains active on the display device.

20 Claims, 6 Drawing Sheets

(56) References Cited

U.S. PATENT DOCUMENTS

| | | | |
|---|---|---|---|
| 2006/0112349 A1 | 5/2006 | Clow et al. | |
| 2007/0101293 A1 | 5/2007 | Cherry et al. | |
| 2007/0112926 A1 | 5/2007 | Brett et al. | |
| 2007/0124507 A1 | 5/2007 | Gurram et al. | |
| 2008/0177844 A1 | 7/2008 | McCarthy et al. | |
| 2008/0250408 A1 | 10/2008 | Tsui et al. | |
| 2009/0204881 A1 | 8/2009 | Murthy et al. | |
| 2012/0050183 A1* | 3/2012 | Lee | G06F 3/1423 345/3.1 |
| 2012/0226742 A1 | 9/2012 | Momchilov et al. | |
| 2014/0006634 A1 | 1/2014 | Eacott et al. | |
| 2014/0098038 A1 | 4/2014 | Paek et al. | |
| 2014/0192137 A1 | 7/2014 | Kim et al. | |
| 2014/0277843 A1 | 9/2014 | Langlois et al. | |
| 2014/0280578 A1 | 9/2014 | Barat et al. | |
| 2014/0320398 A1 | 10/2014 | Papstein | |
| 2014/0349757 A1 | 11/2014 | Nogami et al. | |
| 2015/0237598 A1 | 8/2015 | Yoshitomi et al. | |
| 2016/0210011 A1 | 7/2016 | Ho | |
| 2016/0227278 A1 | 8/2016 | Bugajski et al. | |
| 2016/0283063 A1 | 9/2016 | Missig et al. | |
| 2016/0285974 A1 | 9/2016 | Shurtleff et al. | |
| 2017/0078428 A1 | 3/2017 | Unter Ecker | |
| 2017/0277498 A1 | 9/2017 | Wood, Jr. et al. | |
| 2017/0353569 A1 | 12/2017 | Kozma et al. | |
| 2019/0156788 A1 | 5/2019 | Lee et al. | |
| 2019/0182113 A1 | 6/2019 | Alam et al. | |
| 2019/0191214 A1 | 6/2019 | Mandavilli et al. | |
| 2019/0294268 A1 | 9/2019 | Koyama et al. | |
| 2019/0378519 A1 | 12/2019 | Dunjic et al. | |
| 2020/0099545 A1 | 3/2020 | Hong et al. | |
| 2020/0167699 A1 | 5/2020 | Cohen | |
| 2020/0356243 A1 | 11/2020 | Meyer et al. | |
| 2020/0356254 A1 | 11/2020 | Missig et al. | |
| 2021/0097208 A1 | 4/2021 | Donahue et al. | |
| 2021/0181922 A1 | 6/2021 | Chang et al. | |
| 2021/0248483 A1 | 8/2021 | Tomasik et al. | |
| 2021/0349627 A1* | 11/2021 | Chang | G06F 3/0488 |
| 2022/0070371 A1 | 3/2022 | Bushman et al. | |
| 2022/0070389 A1 | 3/2022 | Tangeland et al. | |
| 2022/0391647 A1 | 12/2022 | Shi et al. | |
| 2023/0041046 A1 | 2/2023 | Agrawal et al. | |
| 2023/0045005 A1 | 2/2023 | Meirhaeghe et al. | |
| 2023/0067649 A1 | 3/2023 | Desai et al. | |
| 2023/0085250 A1 | 3/2023 | Agrawal et al. | |

OTHER PUBLICATIONS

"Check your phone's notifications in Samsung DeX", Samsung Electronics America, Inc. [retrieved Jul. 16, 2021]. Retrieved from the Internet <https://www.samsung.com/us/support/answer/ANS00062702/>., 2019, 3 Pages.

"Do you know about Auto Hotspot?", Samsung [retrieved Jun. 23, 2021]. Retrieved from the Internet <https://r2.community.samsung.com/t5/Tech-Talk/Do-you-know-about-Auto-Hotspot/td-p/2967111>., Dec. 4, 2019, 5 Pages.

"How do you automatically activate Mobile hotspot via Bluetooth connection on Windows 10 Mobile?", in: Windows Central Forums [online][retrieved Jul. 12, 2021]. Retrieved from the Internet <https://forums.windowscentral.com/ask-question/452584-how-do-you-automatically-activate-mobile-hotspot-via-bluetooth-connection-windows-10-mobile.html>., Feb. 19, 2017, 11 Pages.

"Instant Hotspot on your Mac", Apple Inc. [retrieved Jun. 23, 2021]. Retrieved from the Internet <https://support.apple.com/guide/macbook-air/instant-hotspot-apdae69c81f1/mac>., Feb. 2019, 2 Pages.

"Non-Final Office Action", U.S. Appl. No. 17/395,405, filed Dec. 27, 2021, 21 pages.

"Setting up Auto Hotspot on my Samsung phone", Samsung [retrieved Jun. 23, 2021]. Retrieved from the Internet <https://www.samsung.com/au/support/mobile-devices/setup-auto-hotspot/>., Oct. 20, 2020, 8 Pages.

Pratik , "How to Use Your Phone as a Drawing Pad for PC", TechWiser Blog [online][retrieved Jun. 8, 2021]. Retrieved from the Internet <https://techwiser.com/use-phone-as-drawing-pad-for-pc/>., Jul. 15, 2020, 12 pages.

U.S. Appl. No. 17/395,405, , "Final Office Action", U.S. Appl. No. 17/395,405, Jun. 22, 2022, 38 pages.

U.S. Appl. No. 17/395,405, , "Non-Final Office Action", U.S. Appl. No. 17/395,405, Oct. 28, 2022, 39 pages.

U.S. Appl. No. 17/395,405, , "Notice of Allowance", U.S. Appl. No. 17/395,405, May 10, 2023, 9 pages.

U.S. Appl. No. 17/395,405, , "Supplemental Notice of Allowability", U.S. Appl. No. 17/395,405, Jul. 10, 2023, 15 pages.

U.S. Appl. No. 17/395,405, , "Supplemental Notice of Allowability", U.S. Appl. No. 17/395,405, Jun. 28, 2023, 7 pages.

U.S. Appl. No. 17/397,002, , "Non-Final Office Action", U.S. Appl. No. 17/397,002, filed Aug. 3, 2022, 25 pages.

U.S. Appl. No. 17/397,002, , "Notice of Allowance", U.S. Appl. No. 17/397,002, Nov. 16, 2022, 9 pages.

U.S. Appl. No. 17/397,002, , "Supplemental Notice of Allowability", U.S. Appl. No. 17/397,002, Jan. 19, 2023, 3 pages.

U.S. Appl. No. 17/462,281, , "Non-Final Office Action", U.S. Appl. No. 17/462,281, Apr. 26, 2023, 13 pages.

U.S. Appl. No. 17/473,384, , "Non-Final Office Action", U.S. Appl. No. 17/473,384, Oct. 6, 2022, 14 pages.

U.S. Appl. No. 17/473,384, , "Notice of Allowance", U.S. Appl. No. 17/473,384, Feb. 24, 2023, 8 pages.

U.S. Appl. No. 17/473,384, , "Supplemental Notice of Allowability", U.S. Appl. No. 17/473,384, Mar. 31, 2023, 2 pages.

Agrawal, Amit Kumar et al., "U.S. Application as Filed", U.S. Appl. No. 17/473,384, filed Sep. 13, 2021, 68 pages.

Agrawal, Amit Kumar et al., "U.S. Application as Filed", U.S. Appl. No. 17/397,002, filed Aug. 9, 2021, 82 pages.

Bohn, Dieter , "Chromebook Instant Tethering expands beyond Google devices and phones", The Verge Blog, Vox Media, LLC. [online][retrieved Jun. 23, 2021]. Retrieved from the Internet <https://www.theverge.com/2019/2/4/18210378/chromebook-instant-tethering-android-mobile-hotspot-chrome-os-expansion>., Feb. 4, 2019, 6 Pages.

Cipriani, Jason , "How to use Apple's Instant Hotspot feature", CNET [online][retrieved Jun. 23, 2021]. Retrieved from the Internet <https://www.cnet.com/how-to/how-to-use-apples-instant-hotspot-feature/>., Feb. 7, 2019, 4 Pages.

Desai, Rahul B. et al., "U.S. Application as Filed", U.S. Appl. No. 17/462,281, filed Aug. 31, 2021, 57 pages.

GB2210269.3, , "Combined Search and Examination Report", GB Application No. GB2210269.3, Feb. 27, 2023, 9 pages.

Heinisch, Christian , "HotSpot Automatic (free)", Google Play [retrieved Jul. 12, 2021]. Retrieved from the Internet <https://play.google.com/store/apps/details?id=de.christian_heinisch.hotspot.enablehotspot&hl=en_US&gl=US>., Jun. 7, 2018, 3 Pages.

Meirhaeghe, Olivier D. et al., "U.S. Application as Filed", U.S. Appl. No. 17/395,405, filed Aug. 5, 2021, 80 pages.

Russell, Brandon , "Galaxy S21 features wireless support for Samsung DeX on PC", XDA Developers Blog [online][retrieved Mar. 30, 2022]. Retrieved from the Internet <https://www.xda-developers.com/galaxy-s21-wireless-support-samsung-dex-on-pc/>., Feb. 5, 2021, 7 pages.

Snow, Jeffrey T. et al., "U.S. Application as Filed", U.S. Appl. No. 17/473,312, filed Sep. 13, 2021, 48 pages.

Tappert, Charles C. et al., "Chapter 6—English Language Handwriting Recognition Interfaces", In: Text Entry Systems: Mobility, Accessibility, Universality, Morgan Kaugmann [retrieved Jun. 27, 2022]. Retrieved from the Internet <https://doi.org/10.1016/B978-012373591-1/50006-1>, 2007, pp. 123-137.

\* cited by examiner

INPUT DEVICE-INITIATED APPLICATION ACTIVATION

BACKGROUND

In households with Internet connections, the number of connected devices increases every year. In a typical home, each connected device operates independently from the other connected devices within a given household. In many cases, there is a lack of cooperation between the connected devices. This lack of cooperation results in inefficient use of the connected devices as well as inefficient use of the associated network resources.

BRIEF DESCRIPTION OF THE DRAWINGS

Implementations of the techniques for input device-initiated application activation are described with reference to the following Figures. The same numbers may be used throughout to reference like features and components shown in the Figures.

DETAILED DESCRIPTION

Figure 1:
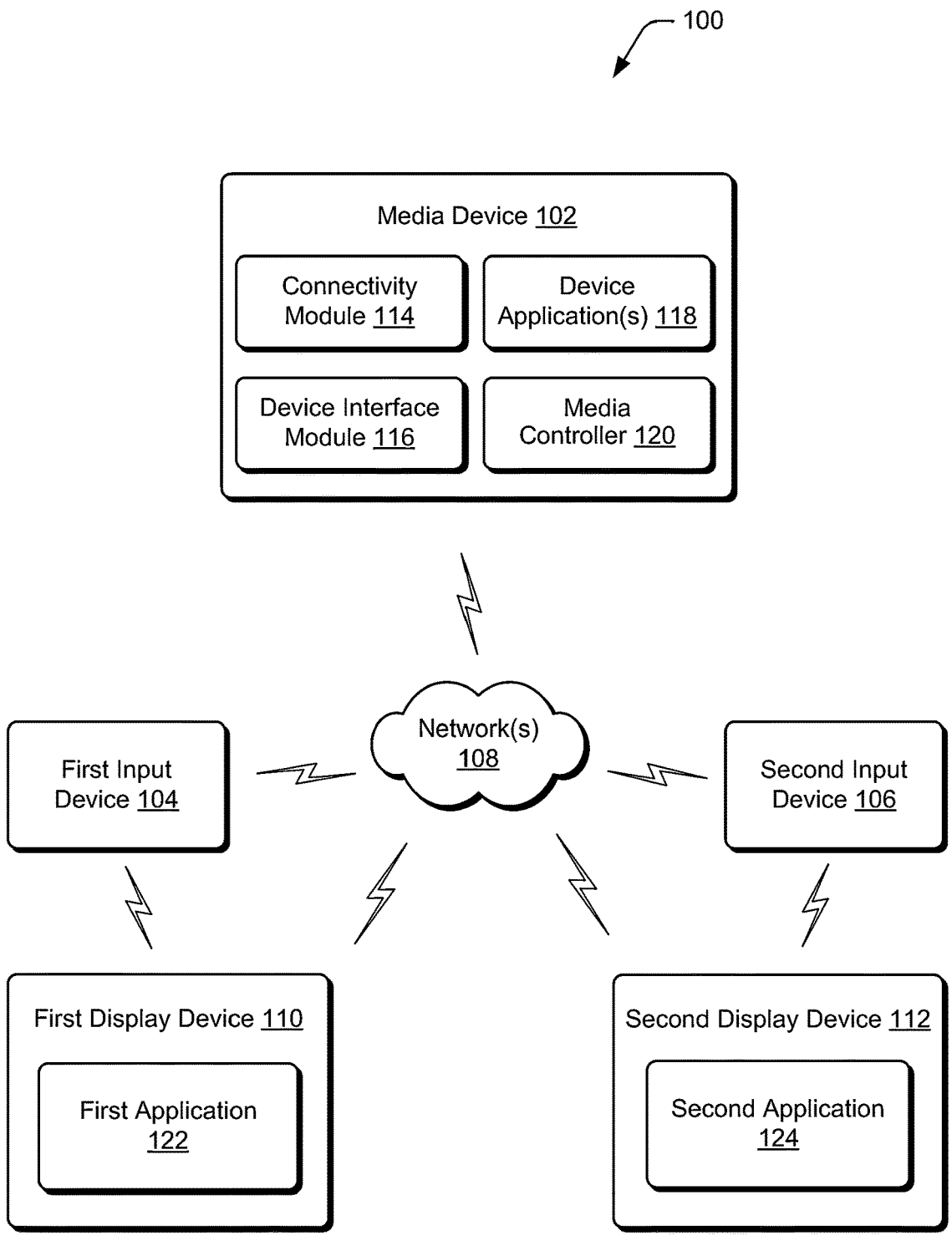
FIG. 1 illustrates an example system for input device-initiated application activation in accordance with one or more implementations as described herein.

Implementations of the techniques for input device-initiated application activation are implemented as described herein. A media device such as any type of media server configured to serve media (e.g., a computing device serving audio, video, productivity applications, gaming applications, communication applications, and the like) to one or more display devices, is configured to perform techniques for input device-initiated application activation as described herein. The media device can be implemented in any type of server, desktop computer, laptop computer, wireless device, mobile device, mobile phone, flip phone, client device, tablet, computing device, communication device, entertainment device, gaming device, media server device, media playback device, and/or any other type of computing and/or electronic device, or a system of any combination of such devices. In some cases, at least one media device implements an instantiation of a media controller, enabling the input device-initiated media server functionality.

With conventional approaches, a display device can be associated with one or more input devices. In one or more variations, a second input device interferes with a first input device and disrupts content on the display device when the first input device is controlling the display device and the second input device simultaneously issues commands to control the display device, resulting in a poor user experience as well as an inefficient use of computing and media resources. Based on conventional approaches, a first user wanting to use a remote control to control a media device to deliver content to a first display device interferes with a second user wanting to use a keyboard to connect to the media device to work on a presentation. The input device-initiated media server functionality described herein provides multiple advantages for user devices (e.g., display devices, input devices, media devices, etc.). For example, the user experience is improved and the capabilities of the user devices are enhanced when control of a display device is limited to the first input device, blocking the second input device from controlling the display device while the first input device is controlling an application presented on the display device.

In one or more examples, a first user has a first display device and a first game controller, and a second user has a second display device and a second game controller. Each user wants to play the same game application on their respective display device using their respective game controller. However, with conventional approaches only a single game controller is allowed to control a single instance of the game each user wants to play, preventing the second user from playing the same game. The user experience and media resource usage are improved when a media device enables the first game controller and the second game controller to each control an instance of the game application on separate display devices. Thus, the input device-initiated media server functionality described herein provides multiple advantages and improved capability of user devices (e.g., input devices, display devices, media devices, and the like).

In aspects of the described techniques, a media controller of a media device implements input device-initiated media server functionality to enable initiation of an input device to trigger activation of an application on a display device and to lock out control of the display device to the initiated input device. In one or more examples, the input device-initiated media server functionality is performed via at least one media device that implements an instantiation of a media controller.

In one or more implementations, the media controller enables control of different input devices from a display device linked to the media device. The media device connects multiple devices simultaneously for control input, data input, audio output, video output, display of video, emitting of audio, camera functionalities, etc. The media device provides computational resources in a distributed architecture system. With a distributed architecture, various components are configured to cooperate and interact over a communication network (e.g., one or more media devices, input devices, display devices, and/or applications interacting over a communication network). In one or more examples, the distributed architecture system includes the media device, a communication network, one or more input devices, one or more display devices, and one or more applications served by the media device.

In one or more implementations, the media device provides media content to display devices (e.g., displays of user devices such as mobile phones, desktops, laptops, tablets, televisions, etc.). The media device can serve media to the display devices and/or perform computations for the user devices (e.g., run and serve applications to the user devices). The media device performs processing operations and serves media content, while the display device shows the content and an input device serves as a user interface to control the operations and applications of the media device.

In one or more implementations, the media controller of a media device determines which input device is activated based on an application running on a display device linked to the media device. The activated input device is allowed to control aspects of the application being served to the display device from the media device. In one or more examples, the media controller identifies each display device connected to the media device. Additionally or alternatively, the media controller identifies the applications that are available to be served to a user device and shown on a display device. In one or more variations, the media controller identifies each application being served to respective display devices. Additionally or alternatively, the media controller connects input devices to the media device. Accordingly, the media controller identifies each input device connected to the media device (e.g., identifies each available input device).

In one or more examples, the media controller connects one or more input devices to the media device. In one or more variations, the media device controls when and what input device is activated. When the media controller detects that an input device is initiated (e.g., turned on), the media controller links the input device to the media device. In one or more examples, initiations of the input device triggers the media controller to start an application (e.g., stream the application most suitable to the input device) on a display device linked to the media device. The media controller links the input device to the display device. For example, when the media controller detects that a game controller is turned on, the media controller streams a game application (e.g., gaming mode) to the display device and links the game controller to the display device.

When the media controller detects an input device is initiated, the media device identifies one or more applications associated with that input device. In one or more implementations, the media device identifies one or more application modes (e.g., game mode, media mode, productivity mode, communication mode) associated with the initiated input device. For example, the media controller identifies a game application or game mode associated with a game controller being initiated, or identifies a productivity application or productivity mode associated with a wireless keyboard being initiated, or identifies a media application or media mode associated with a remote control being initiated.

In one or more examples, the media controller identifies which of the applications (e.g., application modes) is most suitable for the input device initiated. For example, the media controller identifies a game application to be more suitable for a game controller than a productivity application, etc. Additionally or alternatively, the media controller activates an application mode that lists one or more options when a given input device is initiated. For example, the media controller activates a game mode that lists one or more gaming options when a game controller is initiated.

In one or more variations, the media controller restricts control of the activated application on the linked display device to the initiated input device. Additionally or alternatively, the media controller blocks other input devices from controlling the activated application. In one or more examples, the media controller blocks the activated input device from controlling other applications running on other display devices.

While features and concepts of the described techniques for input device-initiated application activation is implemented in any number of different media devices, systems, environments, and/or configurations, implementations of the techniques for input device-initiated application activation are described in the context of the following example devices, systems, and methods.

FIG. 1 illustrates an example system 100 for input device-initiated application activation, as described herein. The system 100 includes one or more media devices, such as a media device 102, a first input device 104, a second input device 106, a communication network 108, a first display device 110, and a second display device 112.

Examples of media devices, such as the media device 102, include at least one of any type of media server, desktop computer, laptop, wireless device, mobile device, mobile phone, flip phone, client device, display device, tablet, computing device, communication device, entertainment device, gaming device, media server device, media playback device, any computing device serving content, any other type of computing and/or electronic device, and/or a system of any combination of such devices.

The media device 102 is implemented with various components, such as a processor system and memory, as well as any number and combination of different components as further described with reference to the example device shown in FIG. 6. In implementations, the media device 102 includes various radios for wireless communication with other devices. In one or more examples, the media device 102 includes at least one of a BLUETOOTH® (BT) or BLUETOOTH® Low Energy (BLE) transceiver, a near field communication (NFC) transceiver, or the like. In some cases, the media device 102 includes at least one of a WI-FI® radio, a cellular radio, a global positioning satellite (GPS) radio, or any available type of device communication interface.

In some implementations, the devices, applications, modules, servers, and/or services described herein communicate via the communication network 108, such as for data communication between the media device 102 and at least one of the first input device 104, the second input device 106, the first display device 110, or the second display device 112. The communication network 108 can include a wired and/or a wireless network. The communication network 108 is implemented using any type of network topology and/or communication protocol, and is represented or otherwise implemented as a combination of two or more networks, to include IP-based networks, cellular networks, and/or the Internet. The communication network 108 can include mobile operator networks that are managed by a mobile network operator and/or other network operators, such as a communication service provider, mobile phone provider, and/or Internet service provider.

The media device 102 includes various functionality that enables the device to implement different aspects of input device-initiated application activation, as described herein. In the illustrated example, the media device 102 includes a connectivity module 114, a device interface module 116, device applications 118, and a media controller 120. The connectivity module 114 represents functionality (e.g., logic, software, and/or hardware) enabling the media device 102 to interconnect with other devices and/or networks, such as the first input device 104, the second input device 106, the communication network 108, the first display device 110, and/or the second display device 112. For example, the connectivity module 114 enables wireless and/or wired connectivity of the media device 102. The device interface module 116 represents functionality enabling the media device 102 to interface with other devices. As further detailed below, the device interface module 116 enables the media device 102 to establish wireless and/or wired data communication with any of the other devices.

The media device 102 can include and implement device applications 118, such as any type of messaging application, email application, video communication application, cellular communication application, music/audio application, gaming application, media application, social platform application, and/or any other of the many possible types of device applications. Many of the device applications 118 have an associated application user interface that is generated and displayed for user interaction and viewing, such as on the first display device 110 and/or the second display device 112 (e.g., in conjunction with the first application 122 and/or the second application 124). Generally, an application user interface, or any other type of video, image, graphic, and the like is digital image content that is displayable on at least one of a display screen of the media device 102, the first display device 110, and/or the second display device 112.

In the example system 100 for input device-initiated application activation, the media device 102 is the media device or media server that incorporates input device-initiated media server functionality. The media device 102 implements an instantiation of the media controller 120 (e.g., as a device application 118). The media controller 120 represents functionality (e.g., logic, software, and/or hardware) enabling implementation of described techniques for input device-initiated application activation. The media controller 120 can be implemented as computer instructions stored on computer-readable storage media and can be executed by a processor system of the media device 102. Alternatively or in addition, the media controller 120 can be implemented at least partially in hardware of a device such as the media device 102.

In one or more implementations, the media controller 120 includes independent processing, memory, and/or logic components functioning as a computing and/or electronic device integrated with the media device 102. Alternatively or in addition, the media controller 120 can be implemented in software, in hardware, or as a combination of software and hardware components. In one or more examples, the media controller 120 is implemented as a software application or module, such as executable software instructions (e.g., computer-executable instructions) that are executable with a processor system of the media device 102 to implement the techniques and features described herein. As a software application or module, the media controller 120 is stored on computer-readable storage memory (e.g., memory of a device), or in any other suitable memory device or electronic data storage implemented with the module. Alternatively or in addition, the media controller 120 is implemented in firmware and/or at least partially in computer hardware. For example, at least part of the media controller 120 is executable by a computer processor, and/or at least part of the media controller 120 is implemented in logic circuitry.

In one or more examples, the media controller 120 detects initiation of the first input device 104 (e.g., the first input device 104 is powered on) based on the media controller 120 monitoring a set of one or more input devices that include the first input device 104. In response to the initiation of the first input device 104, the media controller 120 activates a streaming of the first application 122 to the first display device 110 connected to the media device 102. In one or more variations, the media controller 120 restricts use of the first display device 110 to the first input device 104 while the first application 122 remains active on the first display device 110.

In one or more examples, the media controller 120 establishes a second connection between the second display device 112 and the media device 102 (e.g., concurrent with the connection between the first display device 110 and the media device 102). The media controller 120 detects initiation of the second input device 106 relative to the second display device 112. Based on the initiation of the second input device 106, the media controller 120 activates a streaming of the second application 124 to the second display device 112 connected to the media device 102 (e.g., concurrent with the streaming of the first application 122 to the first display device 110). The media controller 120 can restrict use of the second display device 112 to the second input device 106 while the second application 124 remains active on the second display device 112 (e.g., while the second application 124 continues to stream to the second display device 112). For example, the first input device 104 is blocked from controlling the second display device 112 and/or the second application 124 on the second display device 112 while the restriction of the second display device 112 remains in place.

The input device-initiated media server functionality described herein provides multiple advantages for user devices such as the media device 102, the first input device 104, the second input device 106, the first display device 110, and the second display device 112. For example, the media controller 120 improves the user experience by limiting control of the first display device 110 to the first input device 104, blocking the second input device 106 from controlling the first display device 110 while the first input device 104 is controlling the first application 122 being streamed to the first display device 110.

Figure 2:
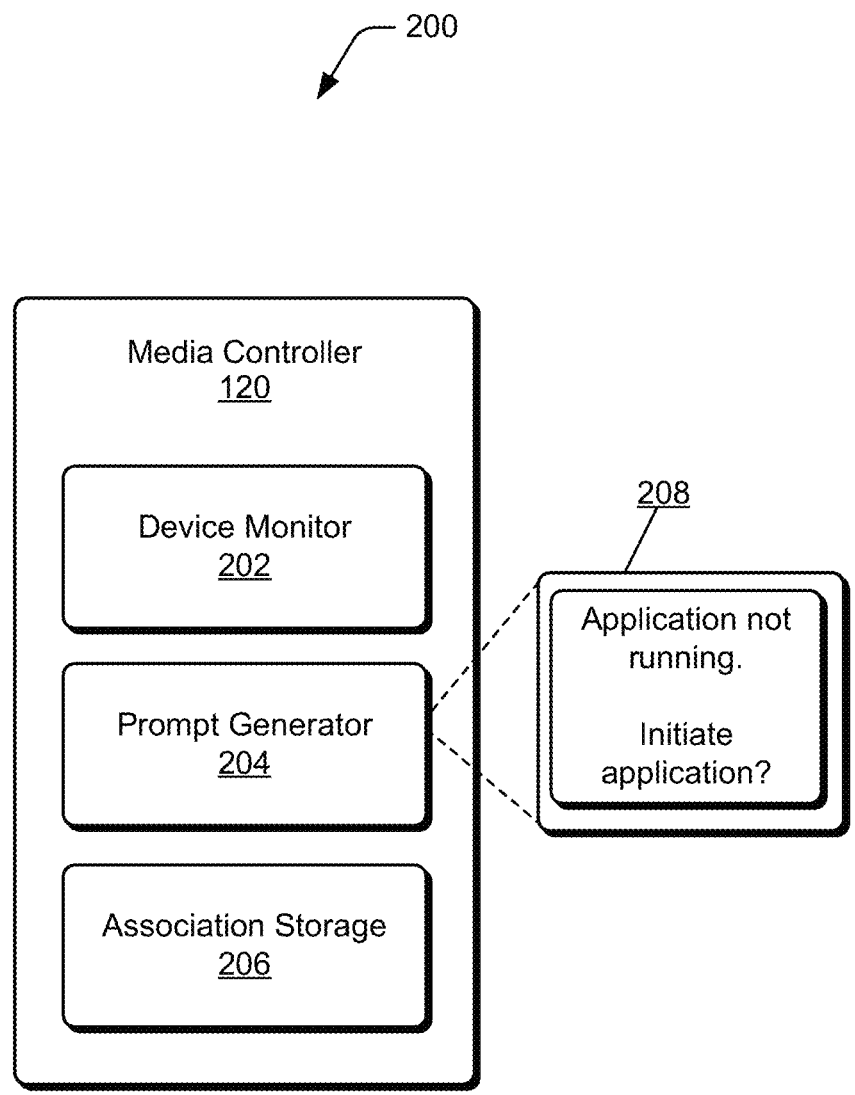
FIG. 2 further illustrates an example of input device-initiated application activation in accordance with one or more implementations as described herein.

FIG. 2 illustrates example 200 of input device-initiated application activation, as described herein. As shown, the media controller 120 includes a device monitor 202, a prompt generator 204, and an association storage 206. In one or more examples, the device monitor 202, the prompt generator 204, and the association storage 206 enable input device-initiated media server functionality associated with content delivery provided by the media device 102.

In one or more examples, the device monitor 202 monitors one or more devices. For example, the device monitor 202 monitors a status of the first input device 104 and the status of the second input device 106, such as any type of status including off, on, in use, not in use, activated, inactive, linked to a display device, not linked to a display device, linked to a particular display device, not linked to a particular display device, battery level, etc.). Similarly, the device monitor 202 monitors a status of the first display device 110 and the status of the second display device 112, such as any type of status including off, on, in use, not in use, activated, inactive, linked to an input device, not linked to an input device, restricted to an input device, not restricted to an input device, linked to the first input device 104, restricted to the second input device 106, etc.

In one or more examples, the device monitor 202 monitors the first display device 110 via a connection between the first display device 110 and the media device 102 (e.g., via the communication network 108). In example implementations, the media controller 120 monitors one or more display devices associated with the media device 102. The media controller 120 determines whether a monitored display device (e.g., the first display device 110) is turned on or turned off, is connected to the media device 102, has a network connection (e.g., Internet connection, connection to the communication network 108), is currently available for use (e.g., no active application is running on the first display device 110), and/or is currently in use (e.g., the first application 122 or another application is already running on the first display device 110), etc.

In one or more implementations, the media controller 120 activates streaming of the first application 122 to the first display device 110 based on the device monitor 202 detecting initiation of the first input device 104. In one or more examples, the media controller 120 activating the streaming of the first application 122 to the first display device 110 is based on the device monitor 202 detecting the first input device 104 being within a threshold proximity to the first display device 110. In one or more variations, the media controller 120 activating the streaming of the first application 122 to the first display device 110 is based on the device monitor 202 determining the first application 122 is associated with the first input device 104 (e.g., the first application 122 is a gaming application and the first input device 104 is a game controller).

In one or more implementations, the device monitor 202 detects that the first application 122 is not executing on the media device 102 and the prompt generator displays a prompt 208 indicating that the first application 122 is not running on the media device 102. The prompt generator 204 displays the prompt 208 to initiate execution of the first application 122 on the media device 102.

The device monitor 202 can detect that the first display device 110 is available (e.g., the first display device 110 is currently not in use) and the device monitor 202 determines whether the first input device 104 is linked to the first display device 110. The media controller 120 links the first input device 104 to the first display device 110 when the device monitor 202 detects initiation of the first input device 104, determines that the first display device 110 is available, and determines that the first input device 104 is not linked to the first display device 110.

In one or more variations, the device monitor 202 detects that the first display device 110 is currently being used. For example, based on the device monitor 202 detecting initiation of the first input device 104, the device monitor 202 detects that the first display device 110 is already being used and the prompt generator 204 displays a prompt indicating the first display device 110 is already in use. For example, the prompt generator 204 displays a prompt on a mobile device (e.g., a smartphone) indicating the first display device 110 is already in use and/or to link the first input device to another display device that is available (e.g., not currently being used).

In one or more examples, the media controller 120 activating the streaming of the first application 122 to the first display device 110 is based on a suitability rating of the first application 122 relative to the first input device 104. In one or more variations, the suitability rating is based on at least one of a learned preference (e.g., user preference) for using the application with the input device, a saved preference (e.g., user preference) for using the application with the input device, or a saved setting of the application indicating the input device as a preferred input device of the application.

In one or more examples, the association storage 206 stores associations between input devices, display devices, and/or applications that run on the display devices. For example, the association storage 206 stores associations between any combination of the first input device 104, the second input device 106, the communication network 108, the first display device 110, the second display device 112, the first application 122, and/or the second application 124. In one or more implementations, the association storage 206 maintains a first association between the first input device 104 and a first set of one or more applications that include the first application 122. Additionally or alternatively, the association storage 206 maintains a second association between the second input device 106 and a second set of one or more applications that include the second application 124.

Example methods 300, 400, and 500 are described with reference to respective FIGS. 3, 4, and 5 in accordance with one or more implementations of input device-initiated application activation, as described herein. Generally, any services, components, modules, managers, controllers, methods, and/or operations described herein can be implemented using software, firmware, hardware (e.g., fixed logic circuitry), manual processing, or any combination thereof. Some operations of the example methods are described in the general context of executable instructions stored on computer-readable storage memory that is local and/or remote to a computer processing system, and one or more implementations include software applications, programs, functions, and the like. Alternatively or in addition, any of the functionality described herein is performed, at least in part, by one or more hardware logic components, such as, and without limitation, Field-programmable Gate Arrays (FPGAs), Application-specific Integrated Circuits (ASICs), Application-specific Standard Products (ASSPs), System-on-a-chip systems (SoCs), Complex Programmable Logic Devices (CPLDs), and the like.

Figure 3:
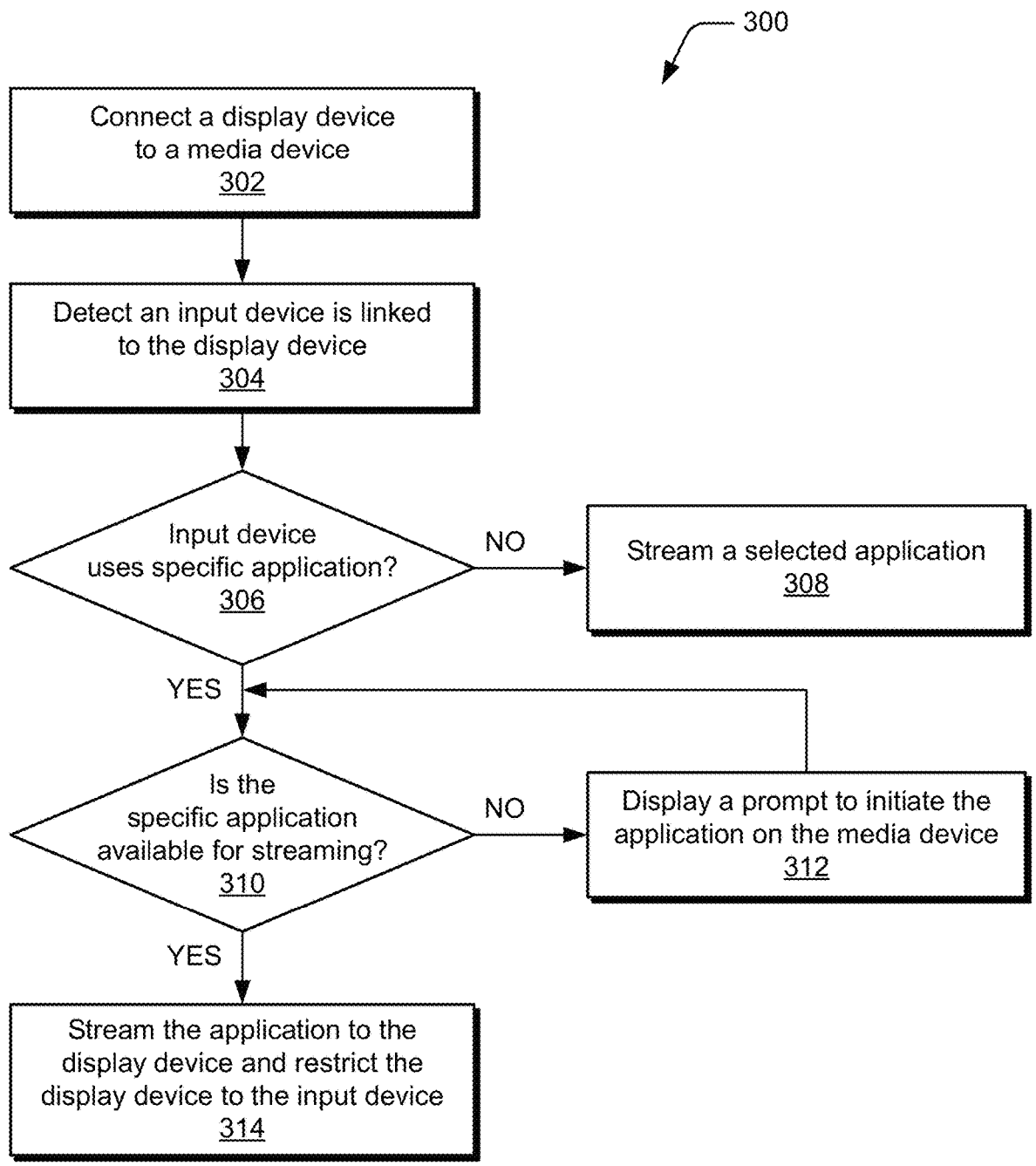
FIGS. 3-5 illustrate example methods for input device-initiated application activation in accordance with one or more implementations of the techniques described herein.

FIG. 3 illustrates example method(s) 300 for input device-initiated application activation. The order in which the method is described is not intended to be construed as a limitation, and any number or combination of the method operations described herein (e.g., of FIGS. 3, 4, and/or 5) may be performed in any order to perform a method, or an alternate method.

At 302, the method 300 includes connecting a display device to a media device. In example implementations, the media controller 120 connects the first display device 110 to the media device 102. Additionally or alternatively, the media controller 120 connects the second display device 112 to the media device 102.

At 304, the method 300 includes detecting an input device is linked to the display device. In example implementations, the media controller 120 detects that the first input device 104 is linked to the first display device 110. Additionally or alternatively, the media controller 120 detects that the second input device 106 is linked to the second display device 112.

At 306, the method 300 includes determining whether the input device uses a specific application. In example implementations, the media controller 120 determines whether the first input device 104 uses a specific application or specific application mode. For example, when the media controller 120 determines that the first input device 104 is a game controller and uses a specific gaming application or specific gaming application mode (e.g., the first application 122 or a mode of the first application 122), the method 300 continues to 310. When the media controller 120 determines that the first input device 104 does not use a specific application or application mode (i.e., "No" from 306), then at 308 the media controller 120 streams an application, such as a default application or an application initiated or selected by a user. In one or more variations, the method 300 ends after streaming the default application or the selected application at 308.

When the media controller 120 determines that the first input device 104 does use a specific application or application mode (i.e., "Yes" from 306), then at 310 the method 300 includes determining whether the specific application is available for streaming. In example implementations, the media controller 120 determines whether the first application 122 is available for streaming from the media device 102. Additionally or alternatively, the media controller 120 determines whether the specific application (e.g., the first application 122) is running on the media device (e.g., the media device 102). For example, when the media controller 120 determines the first application 122 is running on the media device 102, the media controller 120 streams the first application 122 to the first display device 110.

When the media controller 120 determines the first application 122 is not available for streaming from the media device 102 (i.e., "No" at 310), then at 312 the media controller 120 displays a prompt to initiate the first application 122 on the media device 102. Additionally or alternatively, upon determining the first application 122 is not available for streaming from the media device 102, the media controller 120 identifies the first application 122, executes the first application 122 on the media device 102, and initiates streaming of the first application 122. The method 300 returns to 310 and once again determines whether the first application 122 is available for streaming from the media device 102.

When the media controller 120 determines the first application 122 is available for streaming from the media device 102 (i.e., "Yes" at 310), then at 314 the method 300 includes streaming the application (e.g., the specific application) to the display device and restricting the display device to the input device. In example implementations, the media controller 120 streams the first application 122 to the first display device 110 and restricts the first display device 110 to the first input device 104. For example, the media controller 120 restricts control of the first display device 110 and/or the first application 122 on the first display device 110 to the first input device 104, blocking another input device (e.g., the second input device 106) from controlling the first display device 110 and/or the first application 122 on the first display device 110. Additionally or alternatively, upon determining the first application 122 is already running, the media controller 120 initiates streaming of the first application 122 via the first input device 104.

Figure 4:
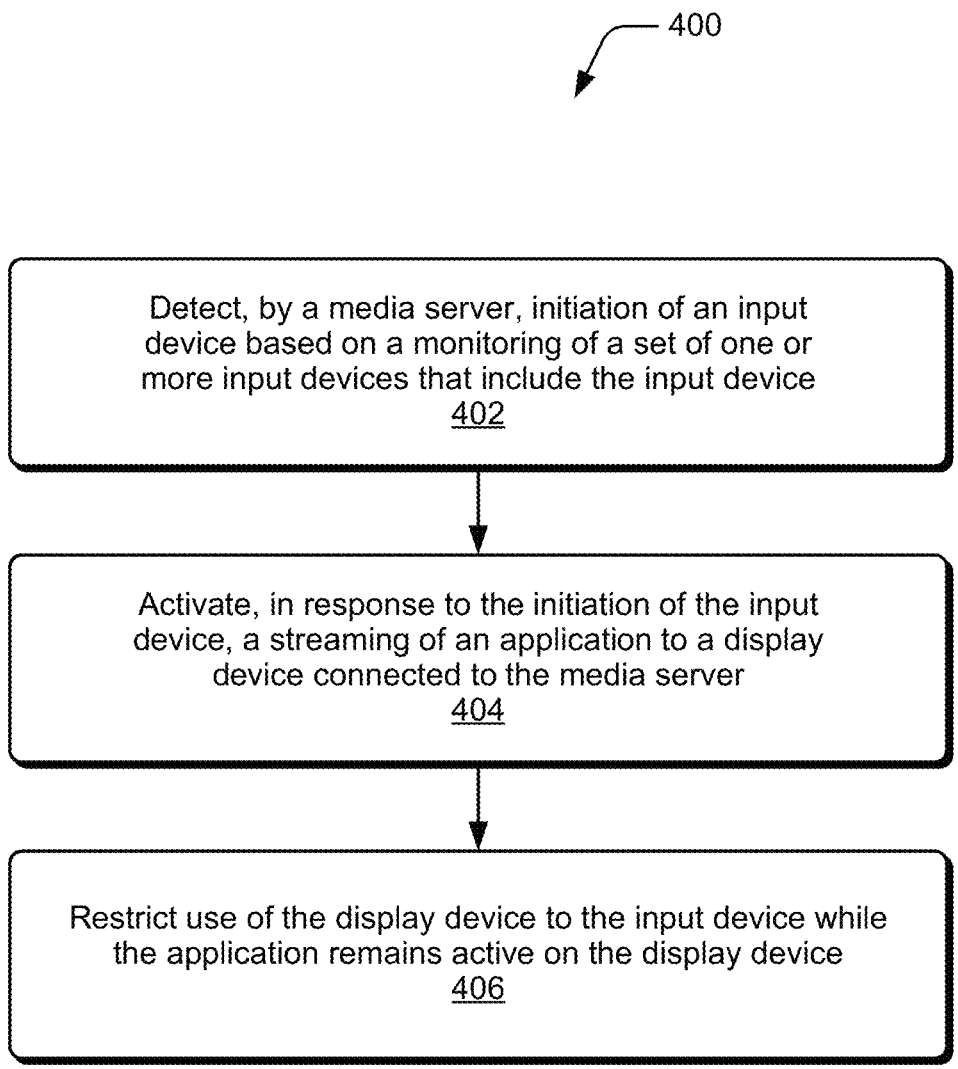

FIG. 4 illustrates example method(s) 400 for input device-initiated application activation. The order in which the method is described is not intended to be construed as a limitation, and any number or combination of the method operations described herein (e.g., of FIGS. 3, 4, and/or 5) may be performed in any order to perform a method, or an alternate method.

At 402, the method 400 includes detecting, by a media server, initiation of an input device based on a monitoring of a set of one or more input devices that include the input device. In example implementations, the media controller 120 detects initiation of the first input device 104 based on the media controller 120 monitoring a set of one or more input devices that include the first input device 104.

At 404, in response to the initiation of the input device, the method 400 includes activating a streaming of an application to a display device connected to the media server. In example implementations, the media controller 120 activates streaming of the first application 122 to the first display device 110 based on a connection between the first display device 110 and the media device 102 and/or a connection between the first display device 110 and the first input device 104. In one or more examples, the media controller 120 activates streaming of the first application 122 to the first display device 110 in response to the initiation of the first input device 104.

At 406, the method 400 includes restricting use of the display device to the input device while the application remains active on the display device. In example implementations, the media controller 120 restricts use of the first display device 110 to the first input device 104 while the first application 122 remains active on the first display device 110.

Figure 5:
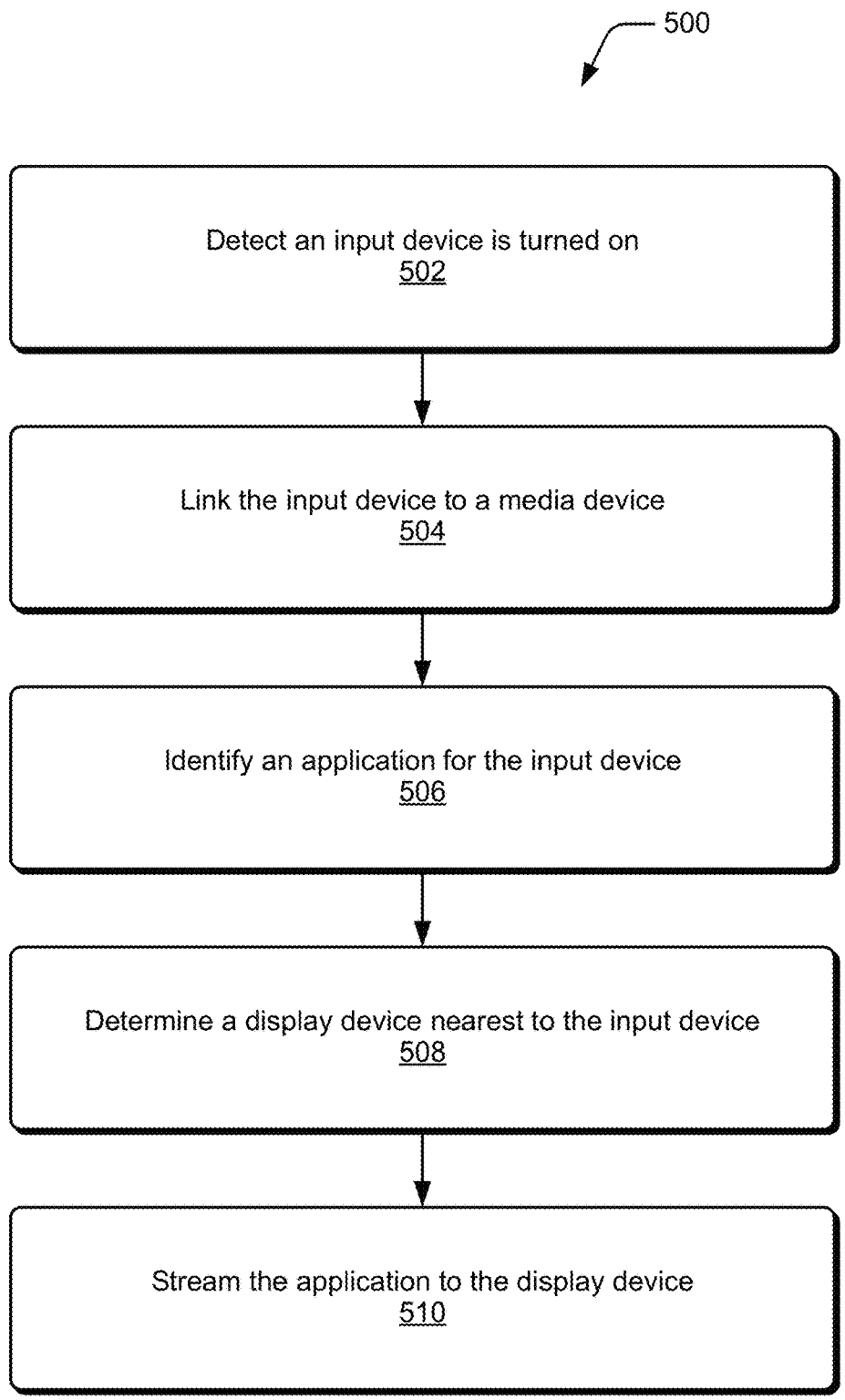

FIG. 5 illustrates example method(s) 500 for input device-initiated application activation. The order in which the method is described is not intended to be construed as a limitation, and any number or combination of the method operations described herein (e.g., of FIGS. 3, 4, and/or 5) may be performed in any order to perform a method, or an alternate method.

At 502, the method 500 includes detecting an input device is turned on. In example implementations, the media controller 120 detects the first input device 104 is turned on. For example, the first input device 104 emits a signal when powered on and the media controller 120 intercepts the emitted signal and identifies the first input device 104 based on the signal (e.g., an identifier of the first input device 104 included in the signal).

At 504, the method 500 includes linking the input device to a media device. In example implementations, the media controller 120 links the first input device 104 to the media device 102. For example, based on the media controller 120 sensing that the first input device 104 is turned on, the media controller 120 establishes a connection with the first input device 104.

At 506, the method 500 includes identifying an application for the input device. In example implementations, the media controller 120 identifies the first application 122 for the first input device 104. For example, the media controller 120 determines that the first application 122 is suitable (e.g., most suitable based on suitability rating) for use with the first input device 104.

At 508, the method 500 includes determining a display device nearest to the input device. In example implementations, the media controller 120 determines the first display device 110 is the nearest display device to the first input device 104. For example, the media controller 120 determines a proximity between the first input device 104 and one or more display devices and determines that the first display device 110 is the nearest display device to the first input device 104. In one or more examples, upon detecting the first input device 104 being turned on and determining that the first display device 110 is the nearest display device to the first input device 104, the media controller 120 links the first input device 104 to the first display device 110 and selects the first display device 110 for streaming of the first application 122 identified at 506.

At 510, the method 500 includes streaming the application to the display device. In example implementations, the media controller 120 streams the first application 122 to the first display device 110. In one or more examples, the media controller 120 restricts control of the first application 122 to the first input device 104 (e.g., blocking other input devices from controlling the first application 122).

Figure 6:
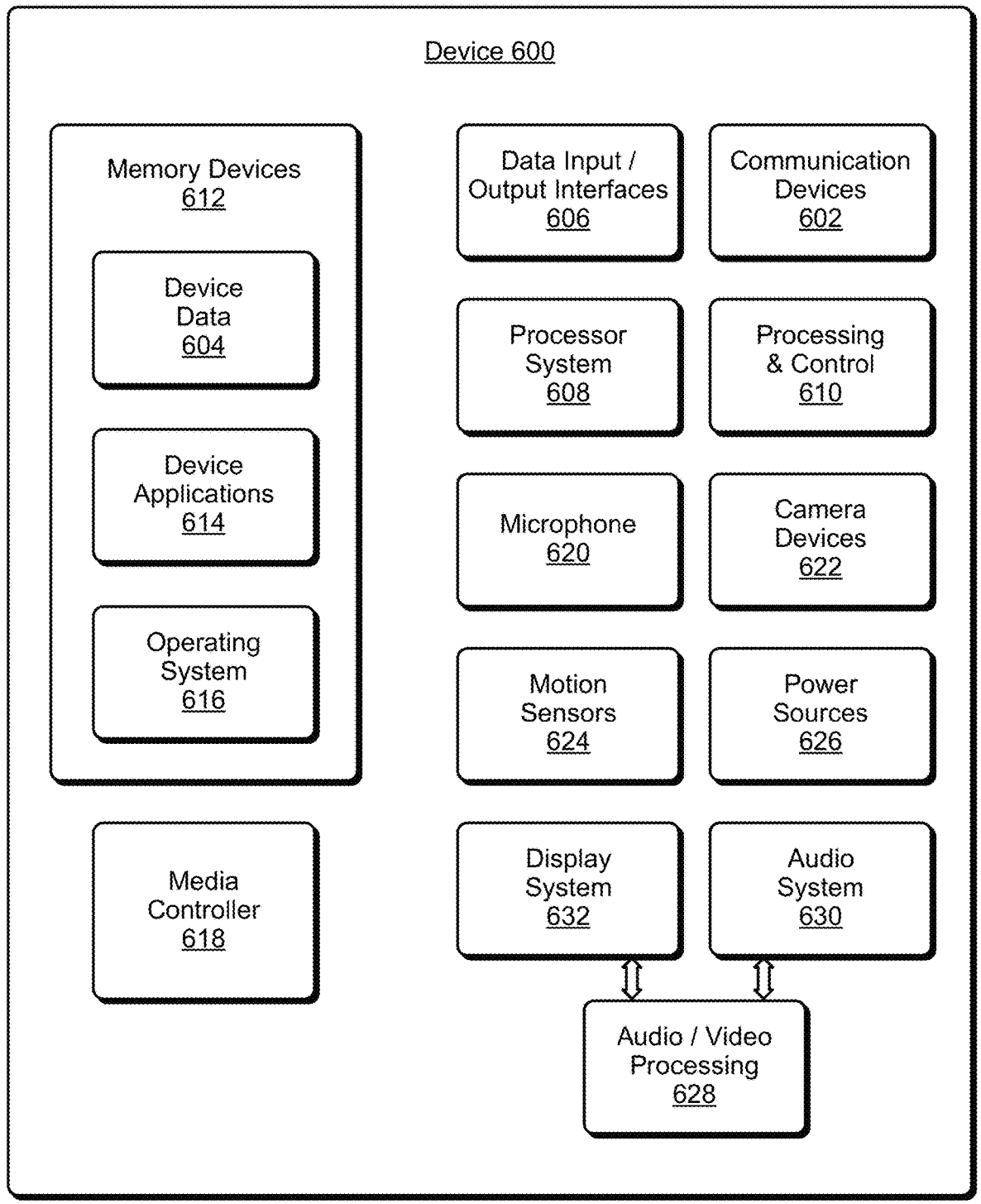
FIG. 6 illustrates various components of an example device that may be used to implement the techniques for input device-initiated application activation as described herein.

FIG. 6 illustrates various components of an example device 600, which can implement aspects of the techniques and features for input device-initiated application activation, as described herein. The example device 600 may be implemented as any of the devices described with reference to the previous FIGS. 1-5, such as any type of a wireless device, mobile device, mobile phone, flip phone, client device, companion device, paired device, display device, tablet, computing, communication, entertainment, gaming, media playback, and/or any other type of computing and/or electronic device. For example, the media device 102 described with reference to FIGS. 1-5 may be implemented as the example device 600.

The example device 600 can include various, different communication devices 602 that enable wired and/or wireless communication of device data 604 with other devices. The device data 604 can include any of the various devices data and content that is generated, processed, determined, received, stored, and/or communicated from one computing device to another. Generally, the device data 604 can include any form of audio, video, image, graphics, and/or electronic data that is generated by applications executing on a device. The communication devices 602 can also include transceivers for cellular phone communication and/or for any type of network data communication.

The example device 600 can also include various, different types of data input/output (I/O) interfaces 606, such as data network interfaces that provide connection and/or communication links between the devices, data networks, and other devices. The I/O interfaces 606 may be used to couple the device to any type of components, peripherals, and/or accessory devices, such as a computer input device that may be integrated with the example device 600. The I/O interfaces 606 may also include data input ports via which any type of data, information, media content, communications, messages, and/or inputs may be received, such as user inputs to the device, as well as any type of audio, video, image, graphics, and/or electronic data received from any content and/or data source.

The example device 600 includes a processor system 608 of one or more processors (e.g., any of microprocessors, controllers, and the like) and/or a processor and memory system implemented as a system-on-chip (SoC) that processes computer-executable instructions. The processor system 608 may be implemented at least partially in computer hardware, which can include components of an integrated circuit or on-chip system, an application-specific integrated circuit (ASIC), a field-programmable gate array (FPGA), a complex programmable logic device (CPLD), and other implementations in silicon and/or other hardware. Alternatively, or in addition, the device may be implemented with any one or combination of software, hardware, firmware, or fixed logic circuitry that may be implemented in connection with processing and control circuits, which are generally identified at 610. The example device 600 may also include any type of a system bus or other data and command transfer system that couples the various components within the device. A system bus can include any one or combination of different bus structures and architectures, as well as control and data lines.

The example device 600 also includes memory and/or memory devices 612 (e.g., computer-readable storage memory) that enable data storage, such as data storage devices implemented in hardware which may be accessed by a computing device, and that provide persistent storage of data and executable instructions (e.g., software applications, programs, functions, and the like). Examples of the memory devices 612 include volatile memory and non-volatile memory, fixed and removable the media devices, and any suitable memory device or electronic data storage that maintains data for computing device access. The memory devices 612 can include various implementations of random-access memory (RAM), read-only memory (ROM), flash memory, and other types of storage media in various memory device configurations. The example device 600 may also include a mass storage the media device.

The memory devices 612 (e.g., as computer-readable storage memory) provide data storage mechanisms, such as to store the device data 604, other types of information and/or electronic data, and various device applications 614 (e.g., software applications and/or modules). For example, an operating system 616 may be maintained as software instructions with a memory device 612 and executed by the processor system 608 as a software application. The device applications 614 may also include a device manager, such as any form of a control application, software application, signal-processing and control module, code that is specific to a particular device, a hardware abstraction layer for a particular device, and so on.

In one or more examples, the device 600 includes a media controller 618 that implements various aspects of the described features and techniques described herein. In one or more variations, the media controller 618 is implemented with hardware components and/or in software as one of the device applications 614, such as when the example device 600 is implemented as the media device 102 described with reference to FIGS. 1-5. An example of the media controller 618 is the media controller 120 implemented by the media device 102, such as a software application and/or as hardware components in the media device 102. In implementations, the media controller 618 includes independent processing, memory, and logic components as a computing and/or electronic device integrated with the example device 600.

The example device 600 can also include a microphone 620 (e.g., to capture an audio recording of a user) and/or camera devices 622 (e.g., to capture video images of the user during a call), as well as motion sensors 624, such as may be implemented as components of an inertial measurement unit (IMU). The motion sensors 624 may be implemented with various sensors, such as a gyroscope, an accelerometer, and/or other types of motion sensors to sense motion of the device. The motion sensors 624 can generate sensor data vectors having three-dimensional parameters (e.g., rotational vectors in x, y, and z-axis coordinates) indicating location, position, acceleration, rotational speed, and/or orientation of the device. The example device 600 can also include one or more power sources 626, such as when the device is implemented as a wireless device and/or mobile device. The power sources may include a charging and/or power system, and may be implemented as a flexible strip battery, a rechargeable battery, a charged super-capacitor, and/or any other type of active or passive power source.

The example device 600 can also include an audio and/or video processing system 628 that generates audio data for an audio system 630 and/or generates display data for a display system 632. The audio system and/or the display system may include any types of devices or modules that generate, process, display, and/or otherwise render audio, video, display, and/or image data. Display data and audio signals may be communicated to an audio component and/or to a display component via any type of audio and/or video connection or data link. In implementations, the audio system and/or the display system are integrated components of the example device 600. Alternatively, the audio system and/or the display system are external, peripheral components to the example device.

Although implementations for input device-initiated application activation have been described in language specific to features and/or methods, the appended claims are not necessarily limited to the specific features or methods described. Rather, the specific features and methods are disclosed as example implementations for input device-initiated application activation, and other equivalent features and methods are intended to be within the scope of the appended claims. Further, various different examples are described, and it is to be appreciated that each described example may be implemented independently or in connection with one or more other described examples. Additional aspects of the techniques, features, and/or methods discussed herein relate to one or more of the following:

In some aspects, the techniques described herein relate to a method including: detecting, by a media server, initiation of an input device based on a monitoring of a set of one or more input devices that include the input device; in response to the initiation of the input device, activating a streaming of an application to a display device connected to the media server; and restricting use of the display device to the input device while the application remains active on the display device.

In some aspects, the techniques described herein relate to the above-described method, including any one or combination of: activating the streaming of the application to the display device is based on detecting the input device within a threshold proximity to the display device. Activating the streaming of the application to the display device is based on determining the application is associated with the input device. The method further comprising detecting that the application is not executing on the media server; and displaying a prompt to initiate execution of the application on the media server. The method further comprising detecting that the display device is available; and linking the input device to the display device. Activating the streaming of the application is based on a suitability rating of the application relative to the input device. The suitability rating is based on at least one of: a learned preference for using the application with the input device; a saved preference for using the application with the input device; or a saved setting of the application indicating the input device as a preferred input device of the application. The method further comprising maintaining a first association between the input device and a first set of one or more applications that include the application; and maintaining a second association between a second input device and a second set of one or more applications. The method further comprising establishing a second connection between a second display device and the media server; and detecting initiation of a second input device relative to the second display device. The method further comprising based on the initiation of the second input device, activating a streaming of a second application to the second display device connected to the media server; and restricting use of the second display device to the second input device while the second application remains active on the second display device.

In some aspects, the techniques described herein relate to a media server including: at least one memory; and at least one processor coupled with the at least one memory configured to cause the media server to: detect initiation of an input device based on a monitoring of a set of one or more input devices that include the input device; in response to the initiation of the input device, activate a streaming of an application to a display device connected to the media server; and restrict use of the display device to the input device while the application remains active on the display device.

In some aspects, the techniques described herein relate to the above described media server, including any one or combination of: activation of the streaming of the application to the display device is based on the at least one processor configured to cause the media server to detect the input device within a threshold proximity to the display device. Activation of the streaming of the application to the display device is based on the at least one processor configured to cause the media server to determine the application is associated with the input device. The at least one processor is configured to cause the media server to: detect that the application is not executing on the media server; and display a prompt to initiate execution of the application on the media server. The at least one processor is configured to cause the media server to: detect that the display device is available; and link the input device to the display device. Activation of the streaming of the application is based on a suitability rating of the application relative to the input device, the suitability rating being based on at least one of: a learned preference for using the application with the input device; a saved preference for using the application with the input device; or a saved setting of the application indicating the input device as a preferred input device of the application.

In some aspects, the techniques described herein relate to a system including: a display device; an input device connected to the display device; and a media controller configured to control aspects of content streaming to the display device, the media controller implemented at least partially in computer hardware to: detect initiation of the input device based on a monitoring of a set of one or more input devices that include the input device; in response to the initiation of the input device, activate a streaming of an application to the display device connected to a media server; and restrict use of the display device to the input device while the application remains active on the display device.

In some aspects, the techniques described herein relate to the above described system, including any one or combination of: activation of the streaming of the application to the display device is based on the media controller being configured to detect the input device within a threshold proximity to the display device. Activation of the streaming of the application to the display device is based on the media controller being configured to determine the application is associated with the input device. The media controller is configured to: detect that the display device is currently being used; and display on the display device a prompt of whether to switch to the application.

The invention claimed is:
1. A method, comprising:
  detecting, by a media server, initiation of an input device based on a monitoring of a set of one or more input devices that include the input device;
  in response to the initiation of the input device, activating a streaming of an application to a display device connected to the media server, the input device linked to the display device and configured to control inputs to the application; and
  restricting use of the display device to the input device while the application remains active on the display device.

2. The method of claim 1, wherein activating the streaming of the application to the display device is based on detecting the input device within a threshold proximity to the display device.

3. The method of claim 1, wherein activating the streaming of the application to the display device is based on determining the application is associated with the input device.

4. The method of claim 1, further comprising:
  detecting that the application is not executing on the media server; and
  displaying a prompt to initiate execution of the application on the media server.

5. The method of claim 1, further comprising:
  detecting that the display device is available; and
  linking the input device to the display device.
6. The method of claim 1, wherein activating the streaming of the application is based on a suitability rating of the application relative to the input device.
7. The method of claim 6, wherein the suitability rating is based on at least one of:
  a learned preference for using the application with the input device;
  a saved preference for using the application with the input device; or
  a saved setting of the application indicating the input device as a preferred input device of the application.
8. The method of claim 1, further comprising:
  maintaining a first association between the input device and a first set of one or more applications that include the application; and
  maintaining a second association between another input device and another set of one or more applications.
9. The method of claim 1, further comprising:
  establishing another connection between another display device and the media server; and
  detecting initiation of another input device relative to the other display device.
10. The method of claim 9, further comprising:
  based on the initiation of the other input device, activating a streaming of another application to the other display device connected to the media server; and
  restricting use of the other display device to the other input device while the other application remains active on the other display device.
11. A media server, comprising:
  at least one memory; and
  at least one processor coupled with the at least one memory configured to cause the media server to:
    detect initiation of an input device based on a monitoring of a set of one or more input devices that include the input device;
    in response to the initiation of the input device, activate a streaming of an application to a display device connected to the media server, the input device linked to the display device and configured to control inputs to the application; and
    restrict use of the display device to the input device while the application remains active on the display device.
12. The media server of claim 11, wherein activation of the streaming of the application to the display device is based on the at least one processor configured to cause the media server to detect the input device within a threshold proximity to the display device.
13. The media server of claim 11, wherein activation of the streaming of the application to the display device is based on the at least one processor configured to cause the media server to determine the application is associated with the input device.
14. The media server of claim 11, wherein the at least one processor is configured to cause the media server to:
  detect that the application is not executing on the media server; and
  display a prompt to initiate execution of the application on the media server.
15. The media server of claim 11, wherein the at least one processor is configured to cause the media server to:
  detect that the display device is available; and
  link the input device to the display device.
16. The media server of claim 11, wherein activation of the streaming of the application is based on a suitability rating of the application relative to the input device, the suitability rating being based on at least one of:
  a learned preference for using the application with the input device;
  a saved preference for using the application with the input device; or
  a saved setting of the application indicating the input device as a preferred input device of the application.
17. A system, comprising:
  a display device;
  an input device linked to the display device; and
  a media controller configured to control aspects of content streaming to the display device, the media controller implemented at least partially in computer hardware to:
    detect initiation of the input device based on a monitoring of a set of one or more input devices that include the input device;
    in response to the initiation of the input device, activate a streaming of an application to the display device connected to a media server, the input device configured to control inputs to the application; and
    restrict use of the display device to the input device while the application remains active on the display device.
18. The system of claim 17, wherein activation of the streaming of the application to the display device is based on the media controller being configured to detect the input device within a threshold proximity to the display device.
19. The system of claim 17, wherein activation of the streaming of the application to the display device is based on the media controller being configured to determine the application is associated with the input device.
20. The system of claim 17, wherein the media controller is configured to:
  detect that the display device is currently being used; and
  display on the display device a prompt of whether to switch to the application.

* * * * *